United States Patent [19]

Grange-Cossou et al.

[11] Patent Number: 5,077,153
[45] Date of Patent: Dec. 31, 1991

[54] PROCESS FOR MAKING AN ELECTRODE WITH A POROUS SUPPORT FOR AN ELECTROCHEMICAL CELL AND ELECTRODE OBTAINED BY SAID PROCESS

[75] Inventors: Michel Grange-Cossou, Le Bouscat; William Torregrossa, Dax, both of France

[73] Assignee: Saft, Romainville, France

[21] Appl. No.: 523,558

[22] Filed: May 15, 1990

[30] Foreign Application Priority Data

Sep. 22, 1989 [FR] France ................. 88 12471

[51] Int. Cl.$^5$ ............................................. H01M 4/80
[52] U.S. Cl. ................................. 429/211; 429/241; 29/623.4
[58] Field of Search ................. 429/211, 241; 29/623.4

[56] References Cited

U.S. PATENT DOCUMENTS 2,985,701  5/1961  Brennan .................... 429/211 X
3,476,604 11/1969  Faber ....................... 429/241 X
4,121,023 10/1978  Parkinson et al. ........... 429/211

Primary Examiner—Stephen J. Kalafut
Attorney, Agent, or Firm—Kenyon & Kenyon

[57] ABSTRACT

A process for making an electrode for an electrochemical cell includes loading a porous metal support with an active material, placing a porous metal electrical connector on the loaded support, and compressing the connector and the loaded support together such that the connector and support interpenetrate each other. The resulting electrode comprises a porous support which is loaded with active material and incorporates an electrical connector displaying a structure similar to that of the support. The three-dimensional structures of the porous materials of the support and of the connector have interpenetrated and bonded through compression.

6 Claims, 1 Drawing Sheet

PROCESS FOR MAKING AN ELECTRODE WITH A POROUS SUPPORT FOR AN ELECTROCHEMICAL CELL AND ELECTRODE OBTAINED BY SAID PROCESS

This invention relates to a process for making an electrode with a porous support for an electrochemical cell and an electrode obtained by said process. It more particularly relates to electrochemical cells having alkaline electrolytes wherein at least one electrode comprises a porous metal support loaded with active material. This porous support displays a matrix structure similar to that of a sponge wherein the cells are interconnected in a three-dimensional matrix: It is referred to as a "porous material." Prior to loading with active material, the porosity of the porous material is greater than 95 percent.

After it is loaded, the electrode is compressed so as to adjust its thickness, which facilitates its assembly and ensures proper operation of the cell.

The cells concerned may comprise flat electrodes, however, such electrodes are more commonly of the spiral-wound type.

The connection of such an electrode to a terminal of the cell requires the addition of a metal connector.

This type of connector presents a problem in that it cannot be welded to the porous material once the porous support has been loaded with active material.

If welding is to be performed prior to loading of the porous material, the preparation of the surface for welding requires an extra operation, and there is a resulting disadvantage in that the welded connection reduces the active surface of the electrode. Such a method displays a further disadvantage in that the reliability of welds of thin components is relatively poor.

It also does not appear to be possible to crimp a porous connector to the porous support. Conversely, it is possible to crimp to such a support a connector made of a metal foil; of course, the disadvantage of this process is that it thickens the electrode, it covers part of the electrochemically active surface and it causes localized rigidity, which is inconvenient for spiral winding.

It is also possible to cut the porous material loaded with active material in such a way as to form a connecting tab. However, this operation is costly as it results in a waste of porous material and a waste of active material.

The object of this invention is to obviate these disadvantages by providing a simple and reliable process for making the said connector.

The object of this invention is a process for making an electrode with a porous support for an electrochemical cell, wherein the process includes providing a support having a porosity greater than 95 percent, loading the support with active material to produce an electrode, and compressing the loaded electrode so as to adjust its thickness, wherein the improvement comprises making at least one connector of a porous material similar to that of the support, but which is not loaded with active material, placing the porous connector on the support which is loaded with active material, and compressing the porous connector onto the support so as to cause the porous connector to penetrate the support.

It is not necessary to prepare a special place for the connector on the active surface of the cell. The porous material which forms the connector is pre-cut from porous material which is not loaded with active material and is not compressed, and which is similar but not necessarily identical to the porous material forming the support of the electrode. The thickness of the connector prior to compression is similar, but not necessarily identical, to that of the electrode support.

The simultaneous compression of the connector and of the loaded electrode support results in interpenetration of their three-dimensional structures, to an extent sufficient to produce an adequate connection.

Such a process more particularly displays the following advantages:

simplicity of the geometric shape of the connector and of implementation;

reduced mechanical stress on the electrode at the time the connection is made compared with prior art processes, which permits using a lighter weight porous support of the electrode;

absence of preliminary preparation operations for the porous support of the electrode;

negligible reduction of the active surface of the electrode because the connection area retains a porosity which is sufficient for proper operation.

A further object of this invention is to produce an electrode according to the process of the invention.

Such an electrode comprises a porous support which is loaded with active material and incorporates at least one electrical connector displaying a porous structure similar to that of the support, and which is not loaded with active material, wherein the three-dimensional porous structures of the porous materials of the support and of the connector are interpenetrated and bonded through compression.

Preferably, the weight per unit area of the support and of the porous material of the connector ranges from 3 $g/dm^2$ to 6 $g/dm^2$.

The connector may be connected to the electrode support over an area ranging from 0.5 percent to 50 percent of the total area of the support.

Other characteristics and advantages of this invention will become apparent from the following description of an embodiment which is provided as a non-limiting example for purposes of illustration.

In the appended drawing:

FIG. 1 shows a porous support 1 made of nickel and having a weight per unit area of 6 $g/dm^2$, a thickness of 1.6 mm, a length of 170 mm, a width of 30 mm. It is loaded with 17 $g/dm^2$ of nickel hydroxide active material.

A porous connector 2 having the same weight per unit area and thickness but with a length of 48 mm and a width of 5 mm is also prepared. The connector 2 is positioned on the support 1 such that it is compressed along the entire width of this support and extends beyond one of the long sides of the support by a length of 18 mm. The assembly is compressed between the plates of a press to a thickness of 0.7 mm.

Figure 1:
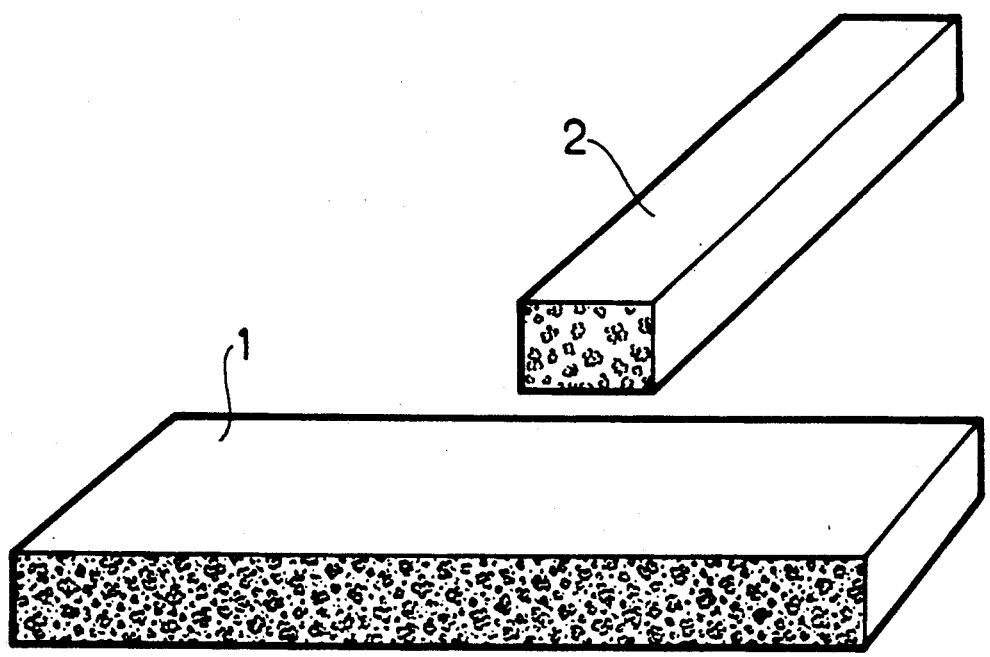
FIG. 1 is a simplified perspective view showing the support of an electrode and its connector according to the invention prior to the compression operation.
Figure 2:
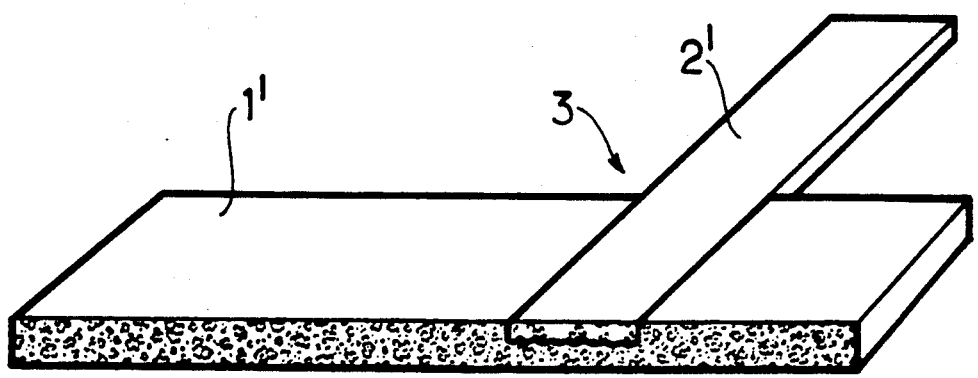
FIG. 2 is a view similar to that of FIG. 1 after the compression operation.

As a result, electrode 3 of FIG. 2 with compressed electrode support 1' and compressed connector 2' is obtained. The electrode thus equipped with its connector may be spirally wound with a negative cadmium electrode and connected to the cell cover by a conventional electric weld.

In a second embodiment, one electrode support and two connectors are employed, wherein the porous material has a weight per unit area of 3.5 g/dm$^2$. The two connectors are positioned facing each other, on the front and on the back of the support, and thus have a total weight per unit area of 7 g/dm$^2$.

In a third embodiment, the electrode support is porous nickel having a weight per unit area of 3.5 g/dm$^2$, a thickness of 1.6 mm, a length of 128 mm and a width of 30 mm.

This porous material is loaded with an active material of a metal alloy hydroxide in an amount of 20 g/dm$^2$.

A connector made of a porous material, having a weight per unit area of 6 g/dm$^2$, a thickness of 1.6 mm, a length of 48 mm and a width of 6 mm is also prepared.

The connector is positioned on the electrode support such that it is compressed over the entire width of the support and extends beyond one of the long sides of the support by a length of 12 mm. The assembly is compressed between the plates of a press to a thickness of 0.4 mm. The electrode thus fitted with its connector may be spirally wound with a positive nickel hydroxide electrode and connected to the cell casing through a conventional electric weld.

Of course, the invention is not limited to the foregoing examples.

Any equivalent means may be substituted for the means described without departing from the scope of the invention.

We claim:

1. A process for making an electrode with a porous support for an electrochemical cell, wherein the process includes providing a support of material having a three-dimensional porous structure and a porosity greater than 95 percent, loading the support with an active material to produce an electrode, and compressing the loaded electrode so as to adjust its thickness, wherein the improvement comprises:
   (a) providing at least one connector made of a material having a three-dimensional porous structure, which is not loaded with active material;
   (b) placing the connector on the support which is loaded with active material prior to the compressing step; and
   (c) performing the compressing step on the support and the connector so as to cause the connector to penetrate the support.

2. A process according to claim 1, wherein step (b) comprises placing two connectors facing each other on either side of the electrode support.

3. An electrode for an electrochemical cell, the electrode including a support made of a material having a three-dimensional porous structure and being loaded with active material, wherein the improvement comprises the electrode having at least one electrical connector made of a material having a three-dimensional porous structure which is not loaded with active material, wherein the three-dimensional porous structures of the porous materials of the support and of the electrical connector are interpenetrated and bonded by compression.

4. An electrode for an electrochemical cell according to claim 3, wherein the weight per unit area of the support and of the porous material of the connector is in the range between 3 g/dm$^2$ and 6 g/dm$^2$.

5. An electrode for an electrochemical cell, according to claim 3 wherein the connector is connected to the electrode support over an area in the range from 0.5 percent to 50 percent of the surface of the electrode.

6. An electrode for an electrochemical cell according to claim 3 wherein the material of the porous support and of the porous connector is nickel.

* * * * *